United States Patent
Ward et al.

(10) Patent No.: US 6,600,520 B1
(45) Date of Patent: *Jul. 29, 2003

(54) COMMAND AND CONTROL ARCHITECTURE FOR A DIGITAL SOUND

(75) Inventors: Christopher Ward, Glen Ridge, NJ (US); Charles M. Wine, Princeton, NJ (US); David B. Homan, Hopewell, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/253,281

(22) Filed: Feb. 19, 1999

Related U.S. Application Data

(63) Continuation of application No. 08/790,132, filed on Jan. 29, 1997, now Pat. No. 5,880,792.
(60) Provisional application No. 60/026,056, filed on Sep. 13, 1996.

(51) Int. Cl.[7] .......................... H04N 5/222; H04N 5/44; H04N 7/00; H04N 7/173; H04N 7/16
(52) U.S. Cl. ...................... 348/722; 348/552; 348/553; 725/91; 725/92; 725/94; 725/114; 725/138; 725/146
(58) Field of Search .................... 348/722, 552, 348/553; 725/91, 92, 94, 114, 116, 135, 138, 144–6, 37, 80; 345/716–723; 709/223–226; 455/507

(56) References Cited

U.S. PATENT DOCUMENTS

| | | | | | |
|---|---|---|---|---|---|
| 4,689,683 | A | * | 8/1987 | Efron | 358/185 |
| 5,208,665 | A | * | 5/1993 | McCalley et al. | 358/86 |
| 5,247,347 | A | | 9/1993 | Litteral et al. | 358/85 |
| 5,297,249 | A | | 3/1994 | Bernstein et al. | 395/156 |
| 5,479,656 | A | | 12/1995 | Rawlings, III | 395/497.02 |
| 5,504,921 | A | * | 4/1996 | Dev et al. | 709/223 |
| 5,649,131 | A | | 7/1997 | Ackerman et al. | 395/335 |
| 5,671,225 | A | | 9/1997 | Hooper et al. | 370/468 |
| 5,675,738 | A | * | 10/1997 | Suzuki et al. | 395/200.09 |
| 5,678,170 | A | * | 10/1997 | Grube et al. | 455/2 |
| 5,880,792 | A | * | 3/1999 | Ward et al. | 348/722 |
| 6,069,666 | A | * | 5/2000 | Lyons | 348/512 |
| 6,362,856 | B1 | * | 3/2002 | Guzik et al. | 348/722 |
| 6,421,733 | B1 | * | 7/2002 | Tso et al. | 709/246 |
| 6,425,005 | B1 | * | 7/2002 | Dugan et al. | 709/223 |

* cited by examiner

*Primary Examiner*—John Miller
*Assistant Examiner*—Paulos Natnael
(74) *Attorney, Agent, or Firm*—William J. Burke

(57) ABSTRACT

A command and control architecture for a compressed digital television broadcast studio. The architecture includes provisions for session management, real-time control of studio activities, the use of proxy objects to establish communications with objects not providing a high level of control, control of studio filter devices and stream management. The invention includes an object architecture particularly suited to a digital studio.

20 Claims, 15 Drawing Sheets

COMMAND AND CONTROL ARCHITECTURE FOR A DIGITAL SOUND

This application claims the benefit of U.S. Provisional Application No. 60/026,056 filed Sep. 13, 1996.

This application is a continuation of application Ser. No. 08/790,132 filed Jan. 29, 1997, now issued U.S. Pat. No. 5,880,792.

The invention was made with Government support under Contract No. 14911 70NANB5H1174. The Government has certain rights in the invention.

The present invention relates to a command and control architecture and, more particularly, to a command and control architecture and concomitant method for management of digital bitstreams in a digital television broadcast studio.

BACKGROUND OF THE INVENTION

The proliferation of digital information has created a new HDTV (High Definition Television) industry employing the concept of a "digital studio". In brief, a digital studio is an environment or system having numerous components where various sources of digital information can be selectively accessed and manipulated (in real time or in delay mode) by multiple clients. For example, a customer can schedule a movie around a "live" broadcast, such that the movie is forwarded to the customer's television by a provider at a particular time, where the movie is paused to forward the "live" broadcast and then resume from the point where the movie was interrupted. Furthermore, digital information is often converted into compressed bitstreams which create issues such as latency and data rate requirements. Thus, the command and control architecture necessary to integrate the various digital studio components presents a unique challenge.

Currently, there is a Digital Storage Media Command and Control (DSM-CC) architecture (ISO/IEC 13818-6, hereby incorporated by reference), which is a specification of a set of protocols for managing the functions and operations of ISO/IEC 11172 Motion Pictures experts Group (MPEG-1) and ISO/IEC 13818 (MPEG-2) bitstreams. More specifically, the DSM-CC protocol set is particularly designed to provide command and control to a system architecture for the delivery of MPEG video streams from a server to a client, e.g., a set-top box. However, since it is anticipated that the numerous components of the digital television broadcast studio will be under distributed control, the current DSM-CC protocol set lacks the flexibility and features that are contemplated for a digital studio.

SUMMARY OF THE INVENTION

A command and control architecture for a compressed digital television broadcast studio. The architecture includes provisions for session management, real-time control of studio activities, the use of proxy objects to establish communications with objects not providing a high level of control, control of studio filter devices and stream management. The invention includes an object architecture particularly suited to a digital studio.

BRIEF DESCRIPTION OF THE DRAWINGS

The teachings of the present invention can be readily understood by considering the following detailed description in conjunction with the accompanying drawings, in which.

DETAILED DESCRIPTION OF AN EMBODIMENT

Figure 1:
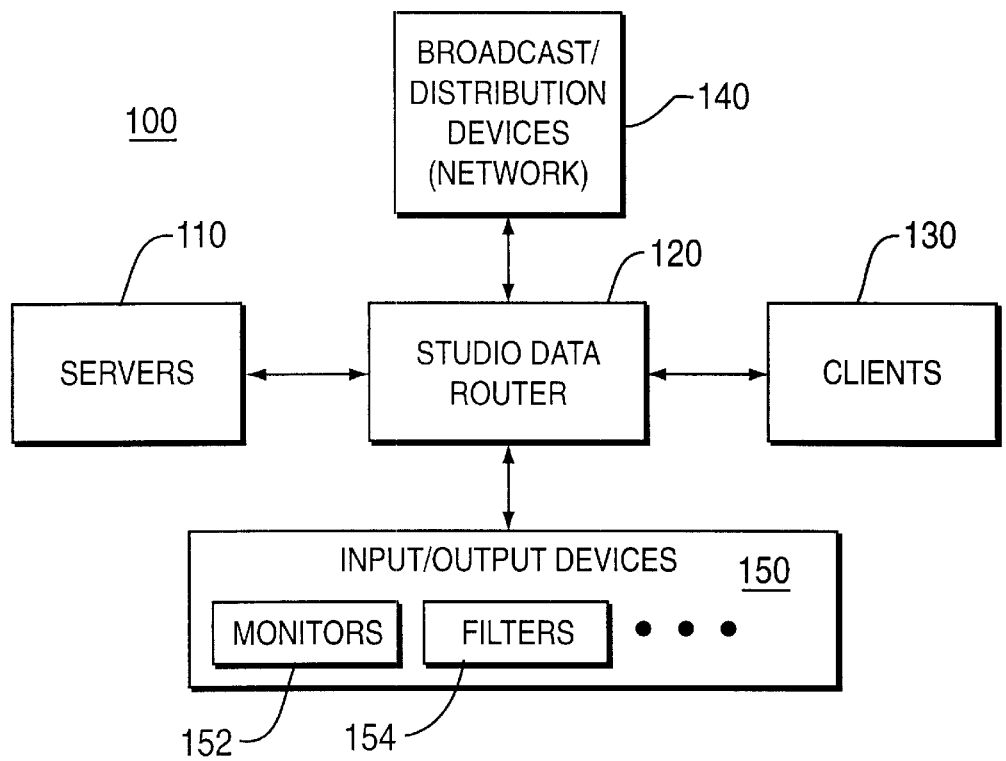
FIG. 1 illustrates a block diagram of a digital studio.

The present invention provides a command and control architecture to address issues including, but not limited to, session management, real-time control, proxy device control and stream management for a digital studio, such as the one shown in FIG. 1. FIG. 1 illustrates a block diagram of a digital studio 100 comprising a studio data router 120, a plurality of servers 110, a plurality of broadcast/distribution devices or networks 140, a plurality of input/output devices and a plurality of clients 130. The digital studio 100 permits the clients 130 to selectively access and/or control the various studio resources, where the clients may include, but is not limited to, a set-top box, a computer or a storage device. In fact, since it is contemplated that the digital studio will be under distributed control, other studio components may serve as clients as well, e.g., the various servers in the digital studio.

The digital studio system components are physically connected to one another through a central switch called the studio data router 120. The studio data router 120 processes the video streams which travel through the digital studio, and also provides services, such as command and control services.

The studio components may include broadcast/distribution devices or networks 140 which may include, but is not limited to, a satellite distribution network, a broadcast network or a local "live-feed" network and various servers 110 holding a large quantity of stored digital information. Furthermore, the studio components may include input/output devices such as monitors 152 and various filters 154, e.g., transcoders, converters, codecs, interface devices and switchers. Each of the various studio components may incorporate the necessary hardware (e.g., one or more processors, computers or workstation) to store or implement software routines or objects. In fact, the various studio components may incorporate other direct signal connections (not shown) among themselves to effect direct communication with each other.

One low level transport protocol which can be used within the digital studio and the present command and control architecture is the Asynchronous Transfer Mode (ATM), which is well suited to provide multiple data streams to a single point. However, those skilled in the art will realize that other suitable low level transport protocols can be used with the present invention. Thus, the present invention provides a command and control architecture for the environment of FIG. 1 or other equivalent digital studio configurations, e.g., as illustrated in FIG. 2.

The present command and control architecture for the digital studio is based on the recognition that broadcast studios using HDTV compressed bitstream technology will include intelligent cooperating system resources/components under distributed control. As such, the studio environment of today, which is modeled on a hierarchy of control emanating from "play-list managers", where data is move between studio components in frame synchronized manner, is replaced by the present invention in which studio video servers, live feeds, monitors, transcoders and switchers are under the distributed control of software objects accessed through workstation user interfaces. Included in this object world will be a "PlayList" class which provides functions consistent with current play-list managers. A programming paradigm well suited to this environment is the concept of distributed object oriented computing, such as the Common Object Request Broker Architecture (CORBA) model. For a detailed discussion on CORBA, see *Understanding CORBA*, by Otte et al., Prentice Hall PTR, 1996.

The command and control architecture of the present invention, called "Digital Studio Command and Control" (hereinafter DS-CC), is an improvement over DSM-CC, in that DS-CC includes provisions for the studio environment. More specifically, data streams are extended to make provision for time control, recording and other studio related considerations and functions. Second, the concept of "proxies" is disclosed to permit all studio components to participate in the studio command and control process. Finally, the management of resources is extended to include components that are used to manage streams within the studio context (e.g., transcoders and switchers). As such, although the present invention is described in conjunction with the DSM-CC protocol, those skilled in the art will realize that the present invention is not so limited.

Figure 2:
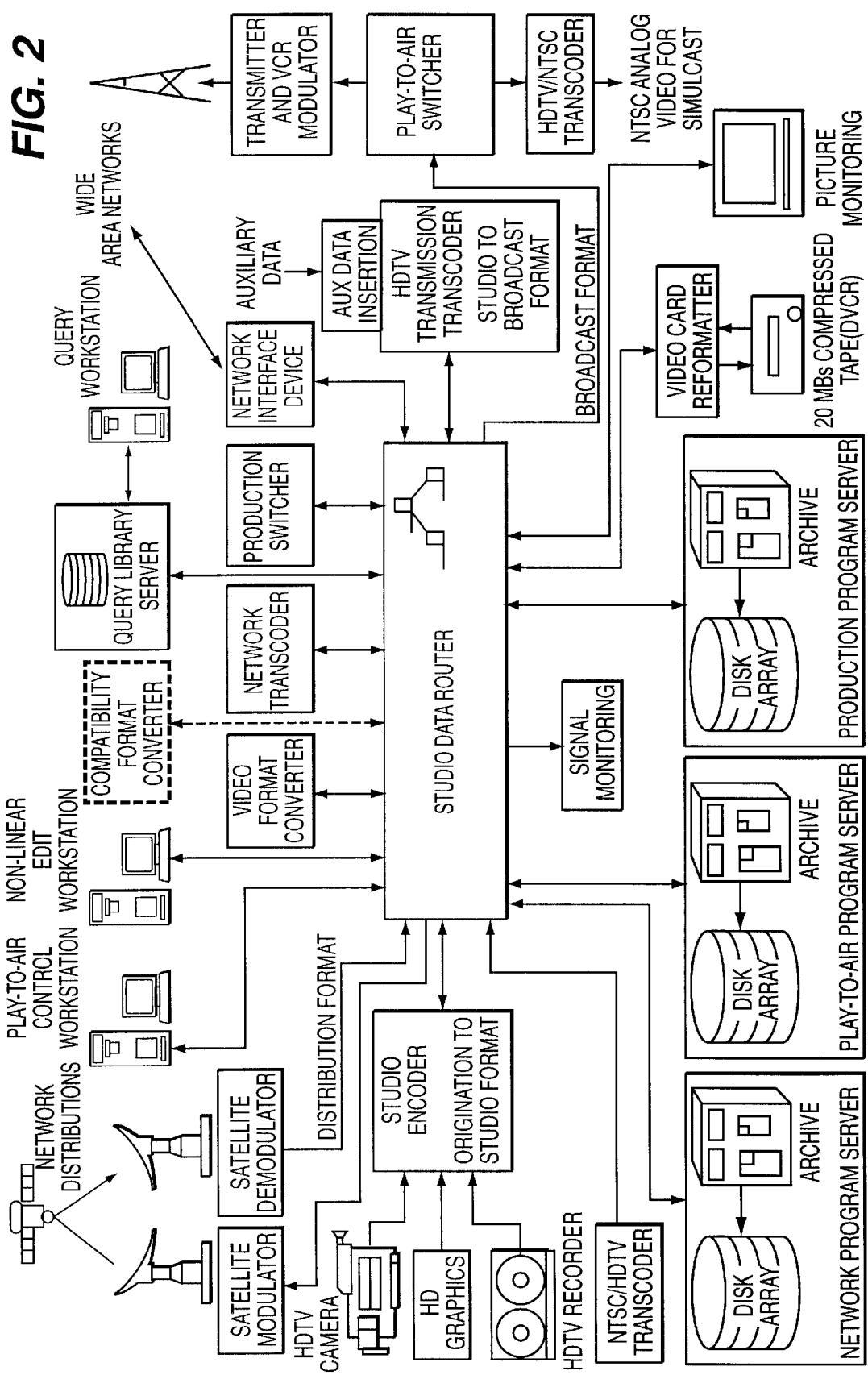
FIG. 2 illustrates a detailed block diagram of one configuration of a digital studio.
Figure 3:
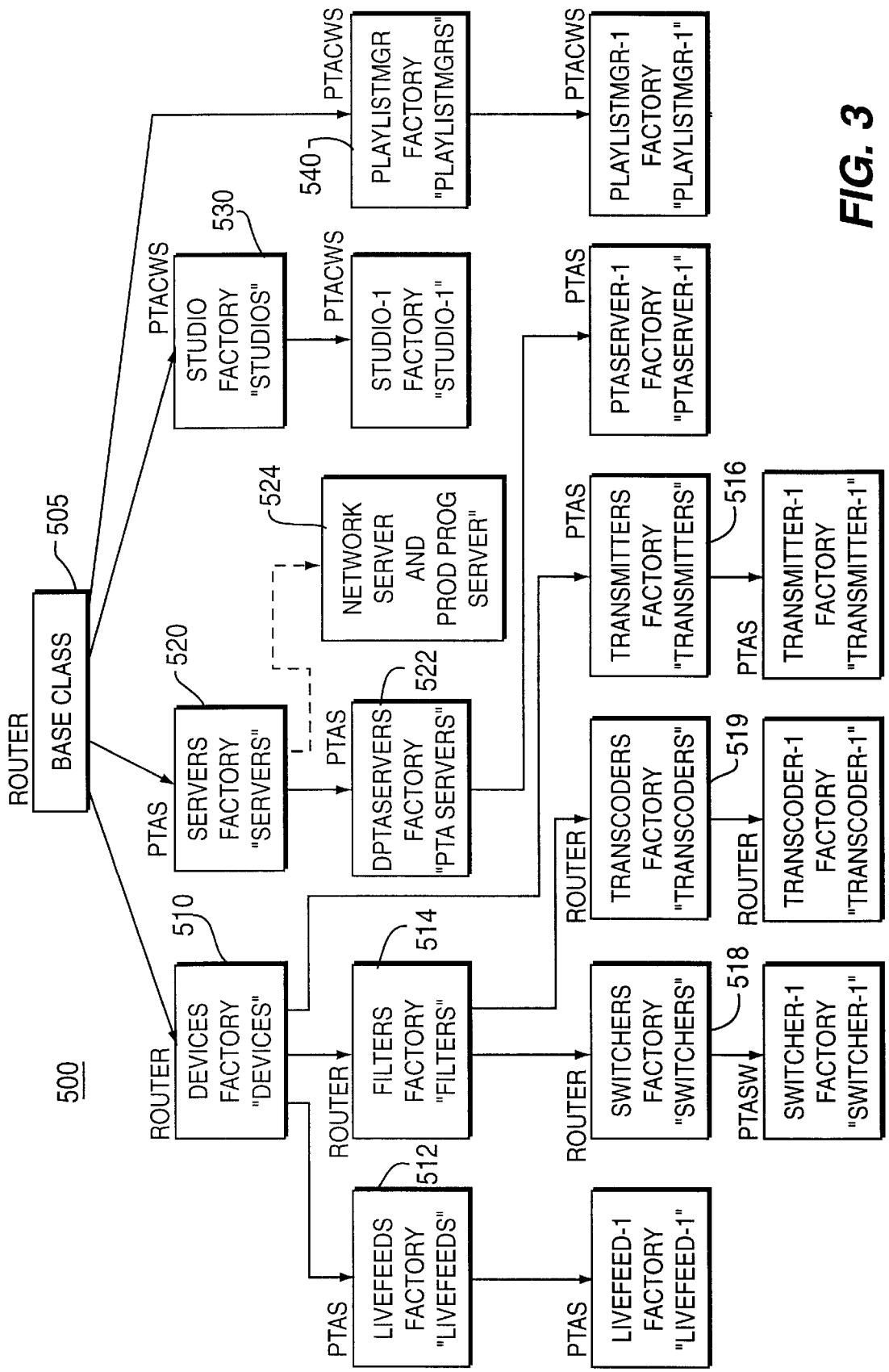
FIG. 3 is a graphical illustration of an embodiment of a studio class hierarchy (studio object world) for the devices or components within a digital studio.

FIG. 3 is a graphical illustration of an embodiment of a studio class hierarchy 500 (studio object world) for the devices or components within a digital studio, e.g., as illustrated in FIG. 2. A class is a template for defining the methods and variables for a particular type of object. Those skilled in the art will realize that the terms "object" and "class" are used in the context of object-oriented computing.

The root of the object class hierarchy or "Naming Context", (conforming with DSM-CC terminology), is a base class 505. Within the base class are the object classes "Devices" 510, "Servers" 520, "Studios" 530 and a variety of software resources 540, e.g., PlayListManagers ("PlayListMgrs"). The Devices class contain three broad categories of components: sources, filters and sinks. More specifically, Devices class 610 contain classes "LiveFeeds" 512 (sources), "Filters" 514 and "Transmitters" (sinks) 516, where the Filter class 514 contains classes "Switchers" 518 and "Transcoders" 519. Similarly, Servers class 520 contains classes "PTAServers" (Play-to-Air) 522, "Network Server" and "ProdProgServer" (Production Program Server) 524. Finally, each class may incorporate numerical designations to specify individual instances of particular studio devices, e.g., "liveFeeds-1", "Switchers-1", "Transcoder-1", and etc.

Furthermore, in each class, a "factory" (also known as "object constructor" for creating new objects) is provided which is used to construct and manage the class in question. To illustrate, for the Device class 510, it is assumed that a "DeviceFactory" exists and is designed to create Devices objects. The location of the objects derived from these classes is accessible through a studio wide directory structure 600 as illustrated in FIG. 4.

Figure 4:
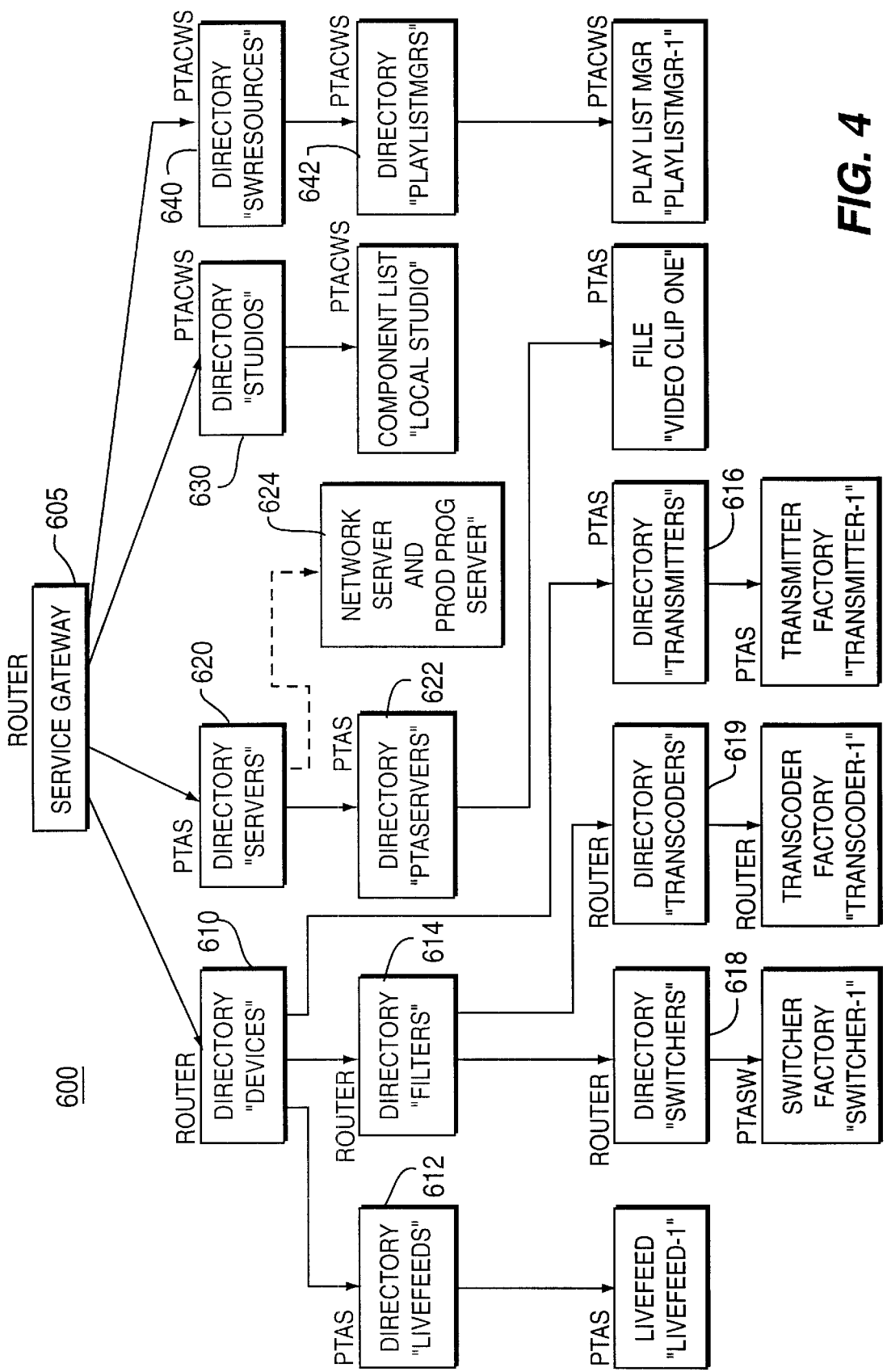
FIG. 4 illustrates a studio object directory structure.

FIG. 4 illustrates a studio object directory structure 600 with a root directory which is a gateway service interface 605. The gateway service interface provides a directory of services and enables a Client to attach to a service domain. In one embodiment, the gateway service interface is the DSM-CC Service Gateway.

Within the gateway service interface 605 are the class directories "Devices" 610, "Servers" 620, "Studios" 630 and "Software Resources" 640 (SWResources). Security within this object hierarchy is provided using the security provisions within the DSM-CC. The general characteristics of the classes are described below.

The "Devices" directory 610 corresponds to all components within the studio that may be manipulated by other objects (i.e., are addressable). Some examples of devices are the general classes "LiveFeeds" 612, "Filters" 614, "Transmitters" 616 and "Monitors" (not shown). In turn, the "Live Feeds" directory 612 contains classes of objects that correspond to video sources that are being delivered from a location which does not provide the flexibility of a server. Examples of live feeds are cameras, and satellite feeds from other locations. In general, this class of object will have only limited control functionality.

The Filters directory 614 contains classes of objects through which video streams pass but are not considered end points. Examples of these filters include transcoders and switchers where their objects are contained respectively in "Switchers" directory 618 and "Transcoders" directory 619.

The "Transcoders" directory 619 contains classes of objects that manipulate the characteristics of video streams, e.g., the picture frame rate or the picture aspect ratio. The "Switchers" directory 618 contains classes of objects that take several video streams as sources and permit the switching (or splicing) between streams to generate an output stream different from any one of the inputs.

The "Transmitters" directory 616 contains classes of objects that correspond to video sinks. Example transmitters include, but is not limited to, the broadcast transmitter and satellite transmitter.

The "Monitors" directory (not shown) contains classes of objects that correspond to studio monitors. These are considered a very general resource and will be used by many of the software resources.

The "Servers" directory 620 contains the names of studio servers within the studio. In one example, the Servers directory 620 contains three servers, a Play to Air Server ("PTAServer") 622, a Network Program Server ("NPServer") and a Production Program Server ("PPServer") 624. The servers store video objects and respond to requests from other objects to deliver and/or store video streams to the requested locations.

The "Studios" directory 630 contains the names of studio objects. Each Studios directory contains the name "Local" which corresponds to the local studio itself.

The "SWResources" directory 640 contains the names of object classes that are used within the studio environment for the purposes of studio management. One such type of class is the "PlayListMgrs" class. The "Play List Managers" directory 642 provides objects corresponding to particular types of play list, e.g., "PlayListMgr-1". A PlayListMgrs object is an object that manages a play list by initiating and switching between video streams to provide a single output stream.

Namely, FIG. 4 can be perceived as a naming space for all the different digital studio components, where the functionality of the different components of the digital studio are distributed. As such traversing the naming space is equivalent to moving physically from one component to another component.

The present command and control architecture provides for real-time stream control. The DS-CC stream commands specify an absolute time at which the command is to be initiated by the object receiving the request. For example the DS-CC "Play" command is "PlayAt(time)", where time is, based on some studio accurate notion of time. Other DS-CC stream commands (e.g., Stop, Pause, etc.) can also be extended to specify an absolute time of occurrence in a similar manner.

A detailed discussion of the present DS-CC architecture is now presented below with reference to FIGS. 5–17. These figures illustrate the application of the DS-CC architecture to different operating scenarios within a digital studio. An associated time sequence diagram is also provided with each scenario to clarify the operation. It should be noted that the labels outside of the various blocks in FIGS. 5, 7, 9, 11, 13, and 15 denote physical studio components whereas the labels within these blocks generally denote software objects.

Similarly, it should be noted that the labels in parenthesis ( ) on top of the time sequence diagrams in FIGS. 6, 8, 10, 12, 14, 16 and 17 denote physical studio components, whereas the labels above the parenthesis ( ) generally denote software objects. Furthermore, the shaded regions correspond to User to Network dialogues and ATM connection control as defined in ITU-T Recommendation Q.2391, B-ISDN Application Protocols for Access Signaling (indicated by the keyword Q.2931). Components with endpoints and those with short double arrows are involved in the dialogue. User to user (UU) dialogues are indicated by single-ended arrows. These dialogues represent a user protocol entity requesting the services of another user protocol entity. Preferably, a C++ style language is used. In the event that a path traverses multiple components, the UU dialogue line is shown only pointing to the final component.

It is recognized that not all components in the studio will be completely enabled to provide a distributed object oriented interface, e.g., a CORBA interface and to participate in communication dialogues with other studio CORBA-like objects. In those cases where a component does not provide this high level of control, the present command and control architecture uses a "proxy server" object. A proxy server object (or proxy object) is one which communicates with studio components on behalf of the component that it is representing. The object then communicates directly with the component using a low level communications protocol such as the Internet Engineering Task Force's (IETF) Simple Network Management Protocol (SNMP) or a proprietary communications protocol. The proxy object significantly enables an open architecture in the digital studio.

Figure 5:
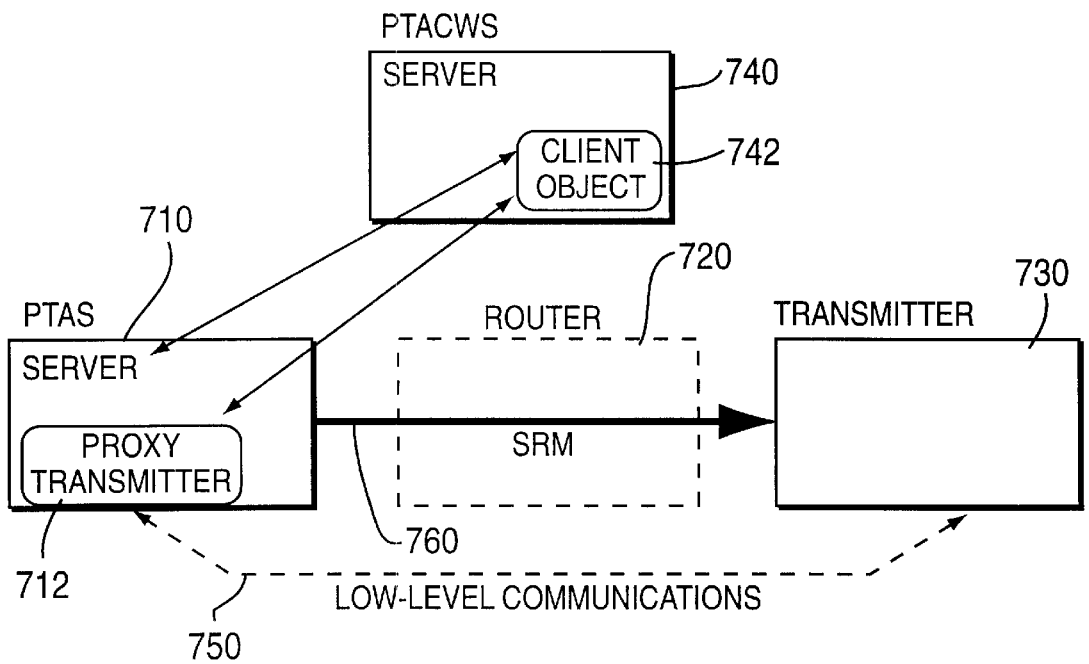
FIG. 5 is a graphical illustration of DS-CC dialogue for a studio including a proxy—controlled device.

FIG. 5 illustrates a block diagram of an example of a DS-CC dialogue for controlling a proxy device (transmitter) 730. A proxy object 712 for the transmitter 730 is illustrated on the PTAS (server) 710. Although the proxy object 712 is illustrated as residing on the PTAS (server) 710, it is not so limited. Instead, FIG. 5 illustrates the flexibility of the software object where it can reside on other studio components or platforms distinct from the physical device that it represents.

The Play-to-Air Control Workstation (PTACWS) (server) software client object 742 accesses the proxy object 712, which then communicates directly with the transmitter 730 through low level communication path 750, e.g., a RS 232 port. The actual ATM connections are constructed between the video source, the PTAS server 710 and the destination, transmitter 730, through the router 720 with a system resource manager (SRM), which is disclosed by the DSM-CC. The SRM is generally responsible for the network services, e.g., setting up bandwidth and communication channel between studio components or managing network resources (e.g., scheduling of network resources).

Figure 6:
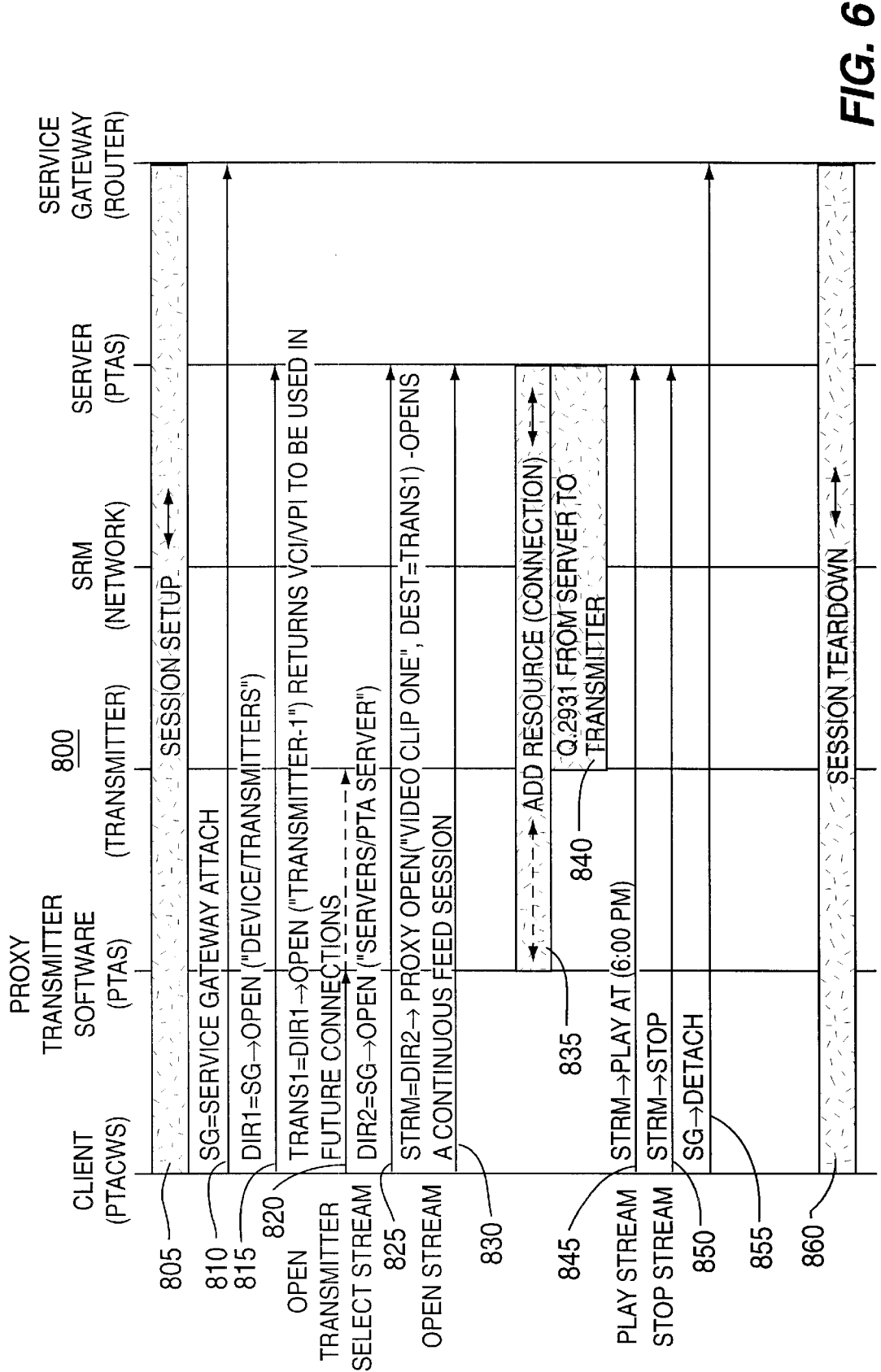
FIG. 6 is a timing diagram for the DS-CC dialogue shown in FIG. 5.

A DS-CC time sequence diagram for the scenario illustrated in FIG. 5 is provided in FIG. 6. FIG. 6 can be perceived as a method 800 for session management of a proxy component. FIG. 6 illustrates the interaction between the studio components (PTACWS, PTAS, Transmitter and Router/Network) in a time sequence diagram that progresses from top to bottom. It should be noted that the SRM is often referred to as the "network" and, as such, the network is perceived to reside in the router.

More specifically, in step 805, the client requests the network to setup a session. A session provides the logical relationship between two users or network applications, e.g., a studio component coming "on-line".

In step 810, the client attaches to the ServiceGateway, which is an indication that the client is announcing its intent to use studio components. The ServiceGateway is defined in the DSM-CC which can be perceived as an access point.

In step 815, the transmitter is located using the naming context as described in the directory structure of FIG. 4 above. The transmitter is found through the "Devices Directory/Transmitters Directory". Since FIG. 4 is a distributed naming context, when the "Open" specification is issued, method 800 may traverse over different points before locating, the desired object. As such, since the Proxy Transmitter 712 resides on the PTAS, the arrow in step 815 ultimately points to the server of the PTAS. Furthermore, step 815 comprises the operation of finding the appropriate device factory (using,"Find"). As such, although the term "Open" is used in step 815, those skilled in the art will realize that it is in fact a "Find" specification.

In step 820, the client of method 800 opens the transmitter and receives an object (proxy object) representing the transmitter. It should be noted that when accessing the transmitter itself, the "Open" specification is a factory request, i.e., creating an instance of the device (using "Open"). When the studio device, transmitter, is opened, method 800 receives back a connection port, e.g., returning VCI/VPI to be used in future connections. Namely, When the client of method 800 opened a studio device, it effectively acquired control over this studio device. Thus, the dashed lines indicate a low level dialogue between the proxy object and the actual device.

In step 825, the Servers/PTAServer is located again using the naming context as described in the directory structure of FIG. 4 above, which, like step 815 above, comprises the operation of finding the appropriate server factory (using "Find"). However, although not specifically shown, step 825 also comprises the additional step of accessing the PTAS itself. Thus, the "Open" specification is again a factory request, i.e., creating an instance of the server (using "Open"). As such, although the term "Open" is used in step 825, those skilled in the art will realize, that it is in fact a "Find" and "Open" specification. Furthermore, when the studio device, PTAS, is opened, method 800 also receives back a connection port, e.g., returning VCI/VPI to be used in future connections.

In step 830, method 800 uses an "ProxyOpen" specification to forward a video clip called "VideoClipOne" to a destination, which is the transmitter. Namely, method 800 is opening a path (video stream), illustrated as 760 in FIG. 5) from the PTAS 710 to the transmitter 730. A continuous feed session is presumed.

In step 835, a low level dialogue is established between the proxy transmitter and the server of the PTAS through the SRM, e.g., resource is requested by PTAS to proxy transmitter and proxy transmitter communicates with the transmitter. The dashed lines indicate a low level dialogue between the proxy object and the actual device. It should be noted that the "AddResource" connection request is an activity of the SRM.

In step 840, a direct connection is established, e.g., a Q.2931 or ATM connection from the PTAS to the transmitter managed by the SRM (720). In summary, a high level dialogue produced a direct connection being established between the PTAS and the transmitter. More importantly, method 800 now acquired a "stream" ("strm") which can be selectively controlled. It should be noted that "stream" is a software object that resides on the PTAS. Namely, "stream" is a software object that corresponds to the state of the underlying video clip. This software object can be accessed in a useful manner as discussed in steps 845 and 850.

In optional step 845, method 800 can selectively access and manipulate the object stream, e.g., play the stream at a prescribed time (6:00 PM, etc.).

In optional step 850, method 800 can selectively access and manipulate the object stream, e.g., stop the stream at a prescribed time. In fact, various VCR like functions are contemplated, e.g., rewind, pause or forward.

In step 855, the client detaches from the ServiceGateway, which is an indication that the client is announcing its intent to terminate access to studio components.

Finally, in step 860, the client may request the network to teardown a session. Thus, FIG. 6 illustrates a method 800 where a request to the proxy transmitter object results in the return of connection information so that connection establishment may proceed directly between the video source and the destination (transmitter). This general approach is used to advantage in more complex cases discussed below.

Figure 7:
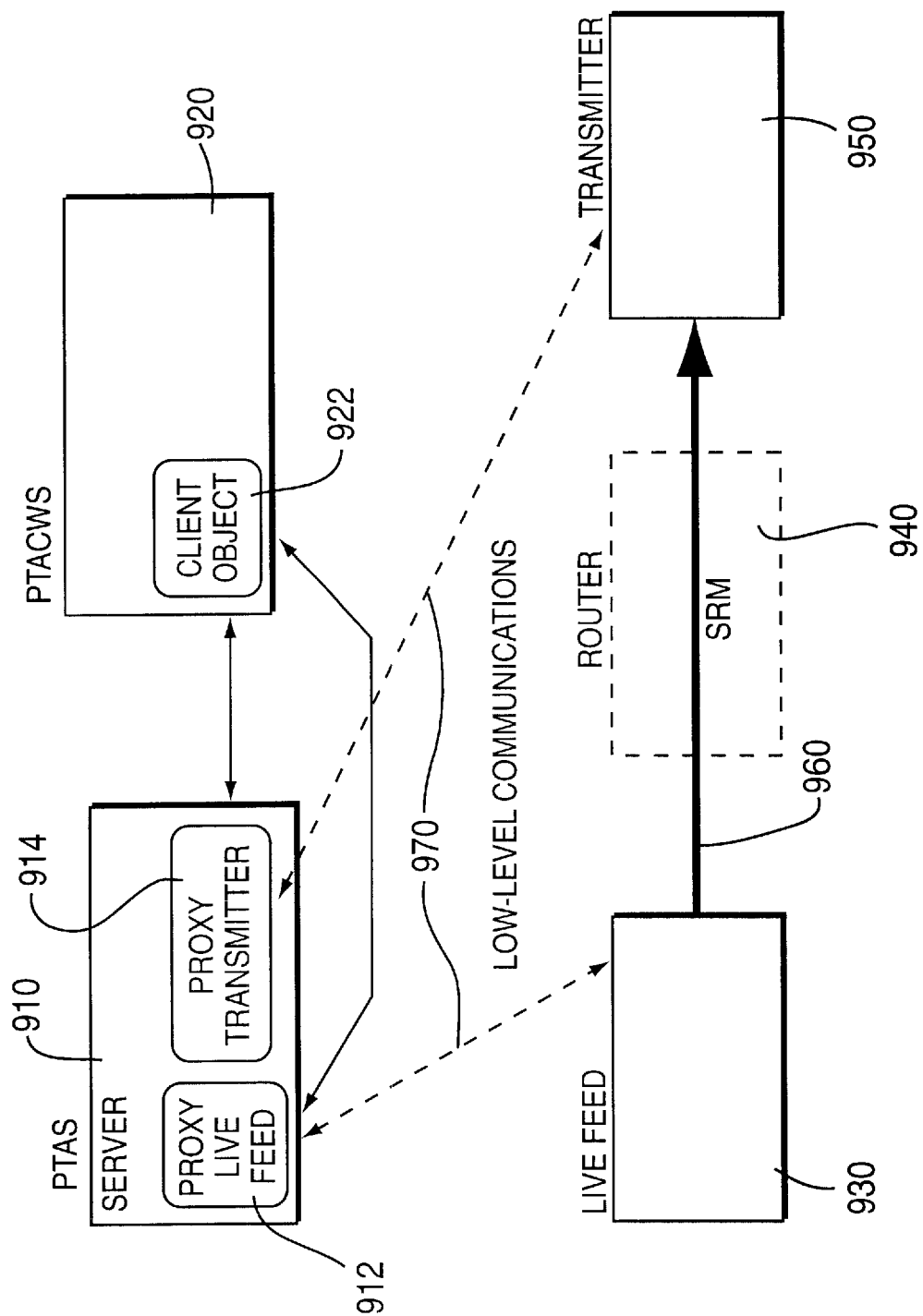
FIG. 7 is a graphical illustration of a DS-CC dialogue for a studio including two proxy—controlled devices.

FIG. 7 illustrates a block diagram of an example of a DS-CC dialogue for controlling two proxy objects in a digital studio embodiment in which neither the source nor the destination is directly controlled. Namely, the software client object 922 (e.g., a playlist-1 object) on the PTACWS 920 (server) simply accesses the proxy object livefeed 912 and proxy object transmitter 914 to effect the transfer of a video stream from a source (live-feed) 930 to a destination (transmitter) 950 via a router 940. Similar to the example of FIG. 5, the proxy objects (proxies) then communicate directly with the livefeed component 930 and transmitter 950 through low level communications paths 970. In this example, both the source and destination have proxies and both proxies reside on the studio component PTAS.

Figure 8:
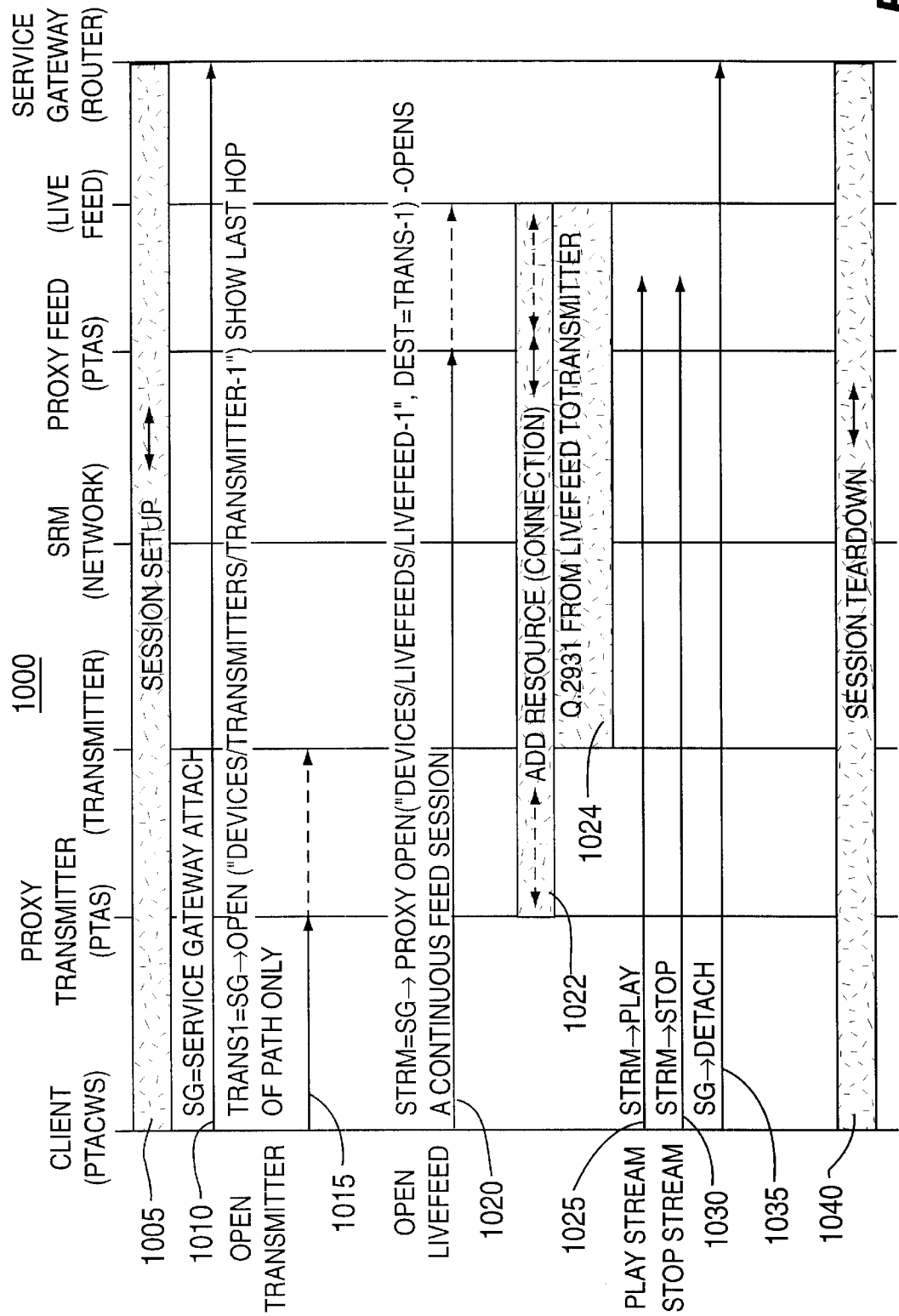
FIG. 8 is a timing diagram for the DS-CC dialogue shown in FIG. 7.

A DS-CC time sequence diagram for the scenario illustrated in FIG. 7 is provided in FIG. 8. FIG. 8 can be perceived as a method 1000 for, session management of two proxy components. FIG. 8 illustrates the interaction between the studio components (PTACWS, PTAS, LiveFeed, Transmitter and Router/Network) in a time sequence diagram that progresses from top to bottom.

More specifically, in step 1005, the client requests the network to setup a session. In step 1010, the client attaches to the ServiceGateway, which is an indication that the client is announcing its intent to use studio components.

In step 1015, method 1000 opens the transmitter 950 and gains control of the transmitter. Although step 1015 illustrates the opening of the transmitter in a single step, it is simply a shortcut expression to indicate the similar steps of 815 and 820 as discussed above in FIG. 6.

In step 1020, method 1000 opens the LiveFeed 930 and gains control of the LiveFeed. In fact, although not shown, step 1015 also includes the step of opening LiveFeed which is also similar to 815 and 820 as discussed. The initial Open only reserves the Transmitter resources while the second Open actually causes a connection to be created between the source and destination. Again, the second "Open" specification is used broadly here. A connection is generally created when operation CreateStream (similar to the steps 825 and 830 of FIG. 6) is performed. Namely, those skilled in the art will realize that the CreateStream operation comprises the steps associated with opening a path between a source and a destination as discussed above. The proxy feed will initiate a connection request with the SRM using a continuous feed session.

In steps 1022 and 1024, the connection is opened between the livefeed and the transmitter by the SRM, for example using a pair of ITU-T Q.2931 Call Setup Indications issued from the switch. This results in a DSM-CC session Setup Indication at the Proxy Transmitter object and a response to the Proxy Live Feed object. The status of this activity is then returned to the initiator by the Proxy LiveFeed object.

Similarly, optional steps 1025 and 1030 also illustrate the availability of VCR like functions in this example. Finally, in step 1035, the client detaches from the ServiceGateway, and the client may request the network to teardown the session in step 1040. The underlying theme is again reiterated where the source and destination paths are specified, thereby resulting in the establishment of a communications dialogue.

In summary, the original command originated from the client object and went to the proxy LiveFeed, which effected a connection with the LiveFeed component. The Proxy LiveFeed then initiates a dialogue with SRM to establish a connection between the physical transmitter and the physical LiveFeed, thereby resulting in a low level ATM connection 960 between the transmitter and the LiveFeed.

Figure 9:
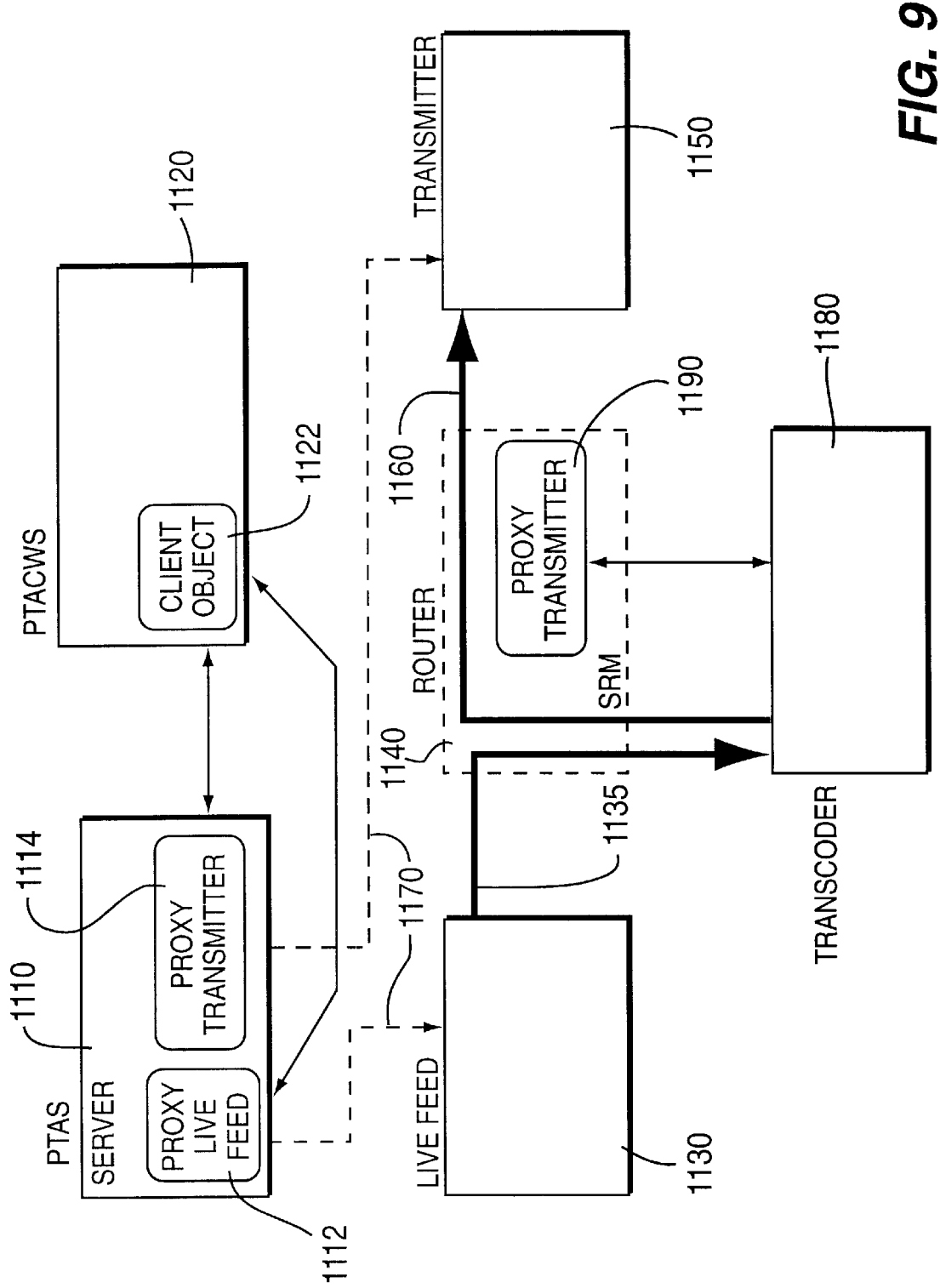
FIG. 9 is a graphical illustration of a DS-CC dialogue where the video stream passes through a transcoder filter.

FIG. 9 illustrates a block diagram of an example of a DS-CC dialogue for controlling two proxies with video stream passing through a transcoder in a digital studio embodiment in which neither the source nor the destination is directly controlled. Namely, the software client object 1122 on the PTACWS 1120 (server) simply accesses the proxy object livefeed 1112 and proxy object transmitter 1114 to effect the transfer of a video stream from a source (live-feed) 1130 to a destination (transmitter) 1150 via a transcoder 1180 and router 1140. The proxies communicate directly with the livefeed component 1130 and transmitter 1150 through low level communications paths 1170. In this example, both the source and destination have proxies and both proxies reside on the studio component PTAS.

Furthermore, the video path 1135 from the livefeed now passes through a transcoder 1180 which is assumed to perform some task such as frame rate conversion, aspect ratio conversion, interlace to progressive scan conversion or bit rate conversion. The video path 1160 from the transcoder then passes through the router and arrive at the transmitter. The transcoder 1180 is controlled by a proxy object 1190 which resides on a studio component, which is the router 1140 in this example.

Figure 10:
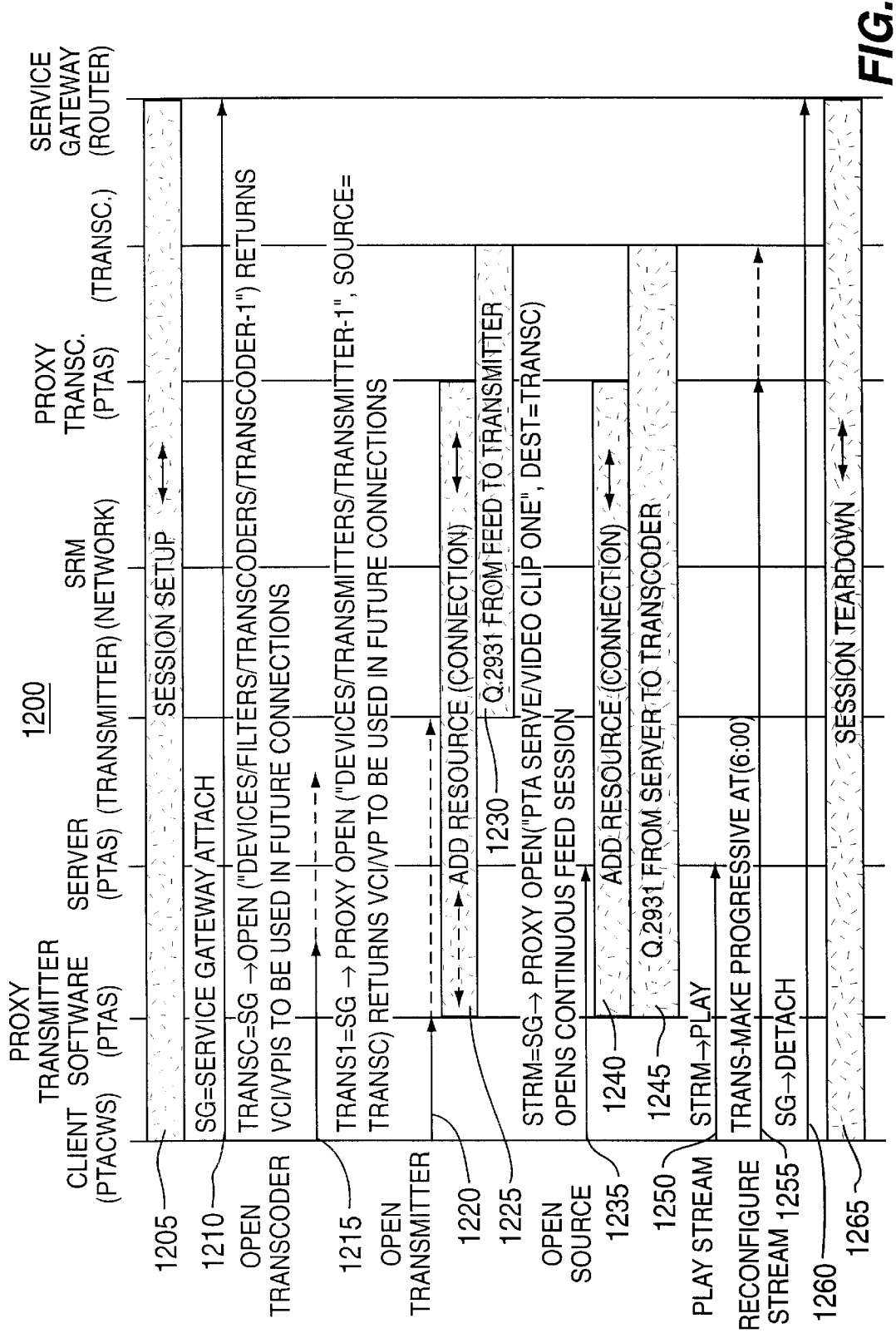
FIG. 10 is a timing diagram for the DS-CC dialogue shown in FIG. 9.

The DS-CC time sequence diagram for the services depicted in FIG. 9 is shown in FIG. 10. To reduce repetitive description, description for steps 1205, 1210, 1225, 1230, 1240, 1245, 1250, 1260 and 1265 is referred to the above discussion with regard to FIGS. 6 and 8.

More specifically, as shown, each controlling object is responsible for obtaining those component resources (filters, switchers, etc.) as are needed prior to actually establishing communication connections. In this example, the transcoder is first obtained in step 1215 (by the Open command) and then a connection is made from the Transmitter to the Transcoder in step 1220 and from the video server to the transcoder in step 1235. Each of these paths is considered to be a separate connection (i.e. there are two "calls" to the transcoder, one "to" it and one "from" it. Once a path has been established, the video is controlled as described earlier with the additional function performed by the transcoder in step 1255. Notice that all connections are managed by the SRM, therefore the SRM has complete knowledge of the system topology. A resource oracle object may be attached to the SRM to provide topology information for studio management by authorized users.

Figure 11:
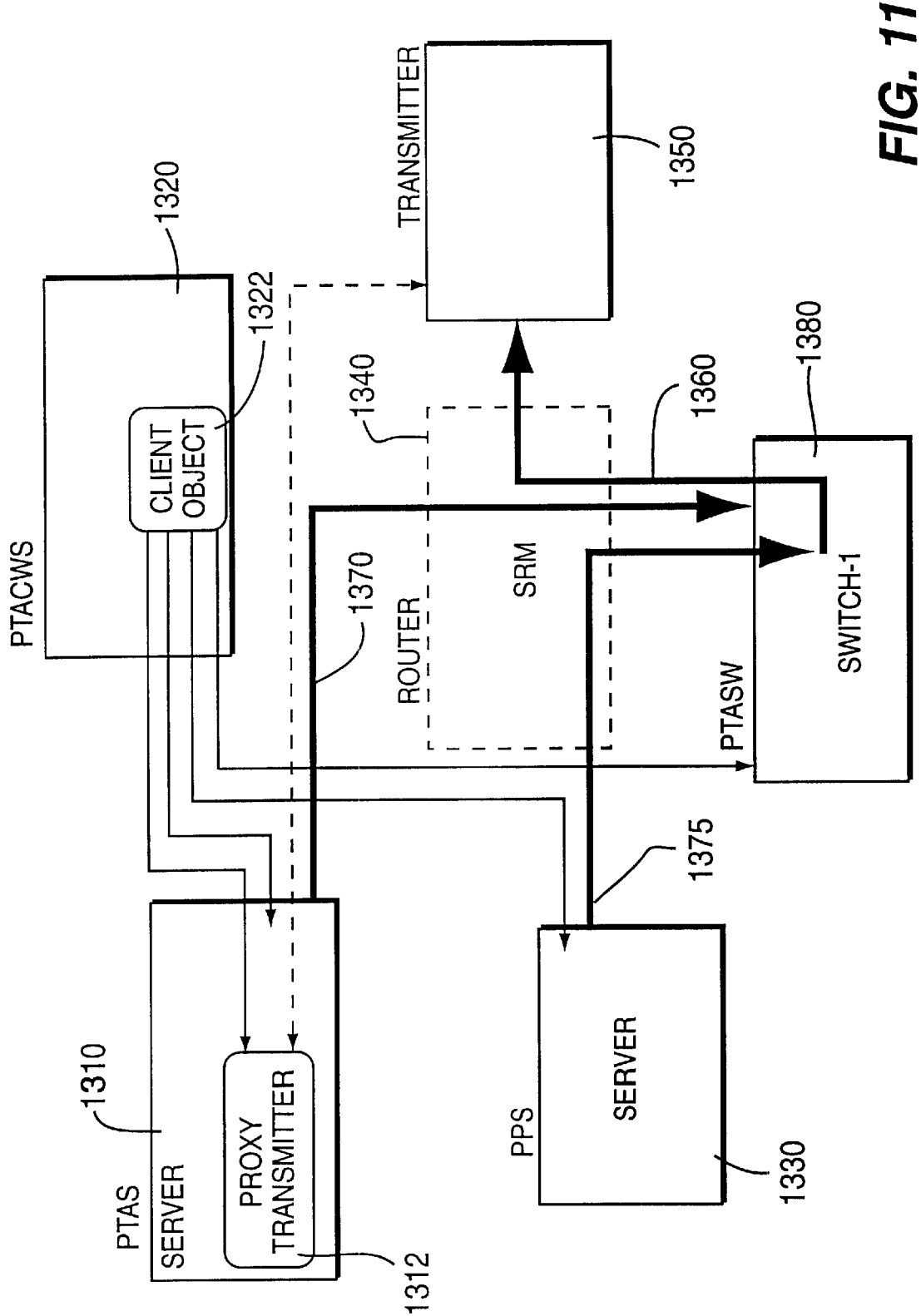
FIG. 11 is a graphical illustration of a DS-CC dialogue for a studio including two servers connected to a switcher.

FIG. 11 illustrates a block diagram of an example of a DS-CC dialogue for controlling two proxies with video stream passing through a Switcher 1380 in a digital studio embodiment. Namely, the software client object 1322 on the PTACWS 1320 (server) simply accesses the proxy transmitter object 1312, PPS server 1330, PTAS server 1310 and the PTASW (switcher) 1380 to effect (or splicing) two streams together to form a new stream. In this context it is assumed that a switcher 1380 (splicer) exists that takes two or more input streams 1370 and 1375 and is able to switch between them under external control through a router 1340 to the transmitter via path 1360. In the embodiment shown in FIG. 11, a video stream is composed from two sources, PTAS 1310 and PPS 1330. The destination is a Transmitter 1350 which is controlled by a proxy object 1313 which resides on the PTAS 1310. The client (controlling object 1322) resides on PTACWS 1320.

Figure 12:
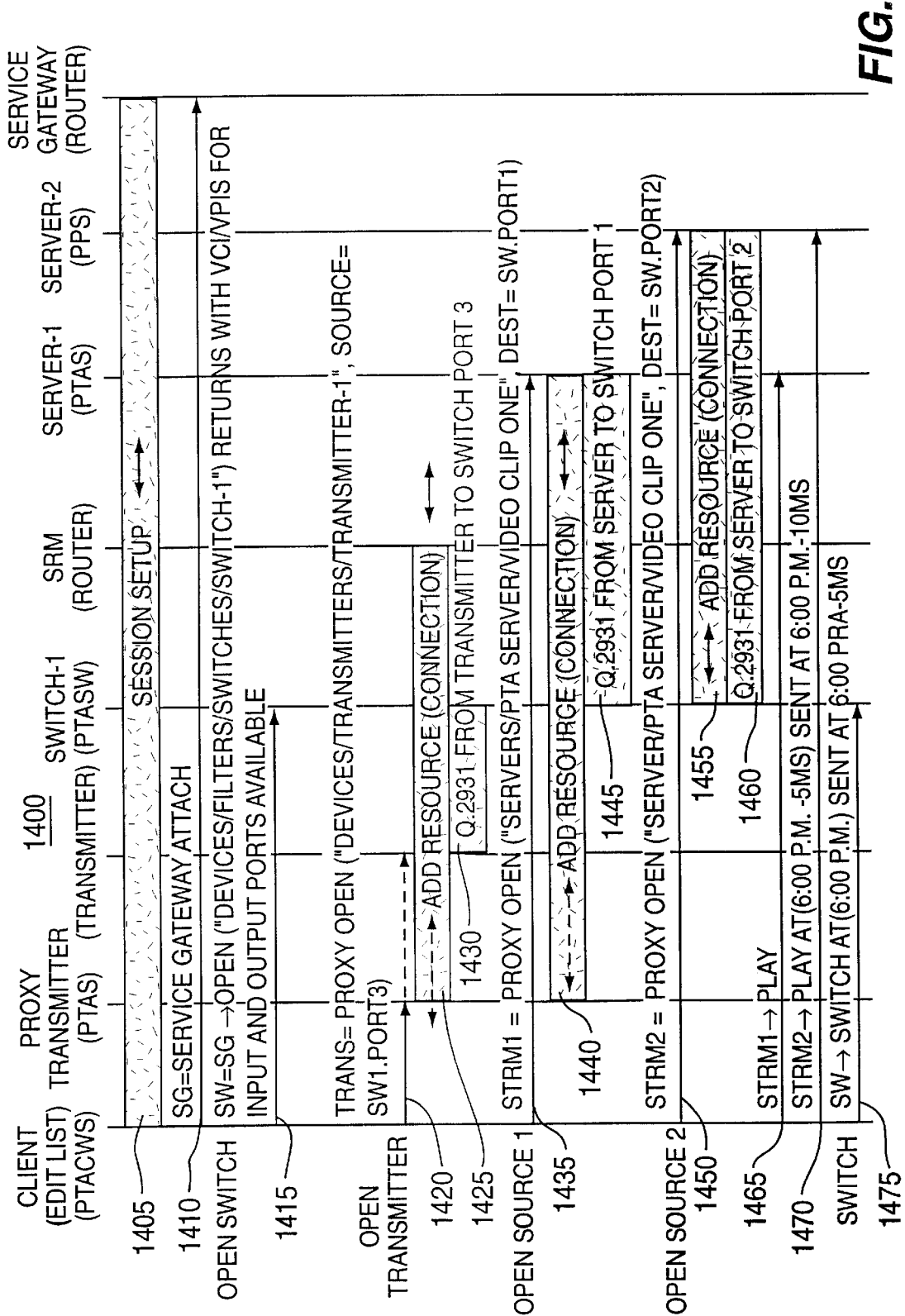
FIG. 12 is a timing diagram for the DS-CC dialogue shown in FIG. 11.

The DS-CC time sequence diagram for the services depicted in FIG. 11 is shown in FIG. 12. To reduce repetitive description, description for steps 1405, 1410, 1425, 1430, 1440, 1445, 1455, 1460, 1465, and 1470 is referred to the above discussion with regard to FIGS. 6, 8 and 10.

FIG. 12 provides a time sequence diagram for a typical scenario for the controlling object (e.g., a PlayList-1 object). As discussed above, each component resource is first obtained using an "Open" command, and then the connections are made between itself and the other objects that will be involved in the video sequence. In this example, the switch 1380 is the first studio component to be opened in step 1415. Method 1400 then opens transmitter 1420, source 1 and source 2 in steps 1420, 1435 and 1450 respectively.

The control sequence at the end of the time sequence diagram illustrates how it is the responsibility of the controlling object to compute any delays that might be involved in the video path. First stream stream-1 in step 1465 is commanded to play (presumably before 6:00 pm), the output to the transmitter 1350 is therefore strm-1. At 6:00 pm—10 msec a command is sent to stream stream-2 in step 1470 to start playing at 6:00 pm—5 msec. It is assumed that the delay incurred in this command being delivered is less than 5 msec. The time for the first bit of the video stream to reach the switch 1380 is assumed to be 5 msec, therefore the start of the first frame arrives at the switcher at 6:00 pm exactly. The command to switch at 6:00 pm in step 1475 is sent to the switcher some period before the switch is required, in this case at 6:00 pm—5 msec. The switch occurs within the switcher 1380 at 6:00 pm and the resulting stream is derived from stream stream-2. At this point stream-1 may be terminated.

Figure 13:
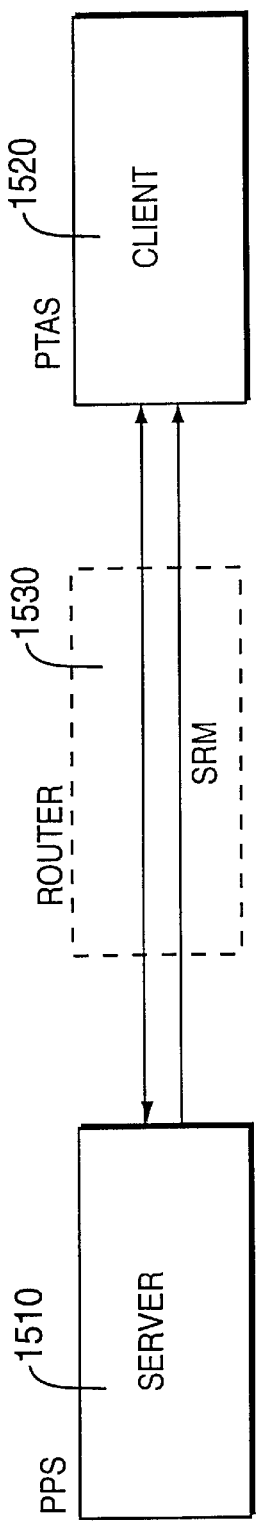
FIG. 13 is a graphical illustration of a DS-CC dialogue for storing video from a server to a client.

FIG. 13 illustrates a block diagram of an example of a DS-CC dialogue for storing video from a server 1510 to a client 1520 in a digital studio embodiment. The storage is done under client control via a router 1530. One important requirement within the context of a compressed digital studio is to store streams, for example, a new stream constructed from a series of edits may require storing back on a video server as a new object. FIG. 13 illustrates the storing of video from a server (the PPS) 1510 to a new storage object on the PTAS 1520.

Figure 14:
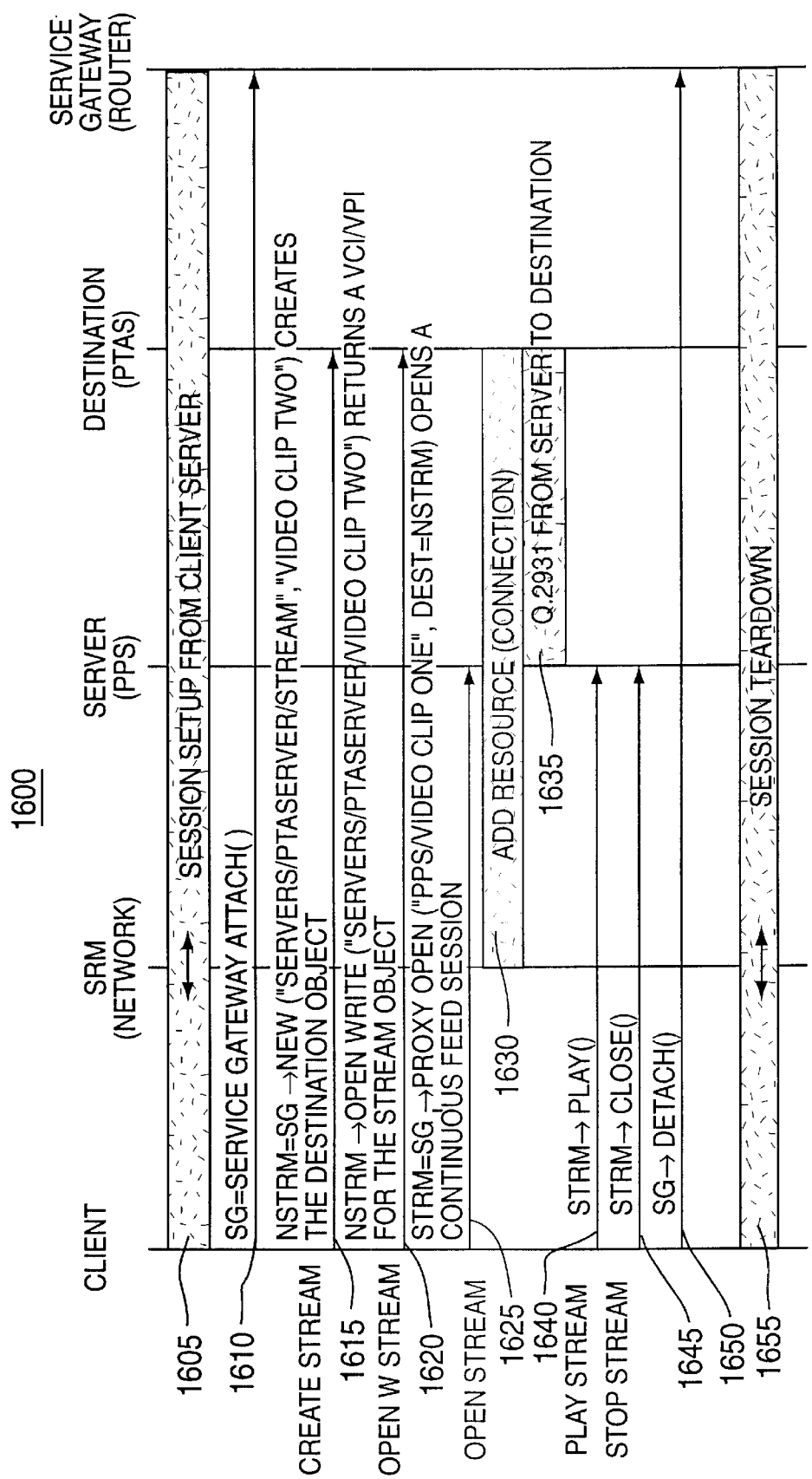
FIG. 14 is a timing diagram for the DS-CC dialogue shown in FIG. 13.

The DS-CC time sequence diagram for the services depicted in FIG. 13 is shown in FIG. 14. To reduce repetitive description, description for steps 1605, 1610, 1630, 1635, 1640, 1645, 1650, and 1655 is referred to the above discussion with regard to FIGS. 6, 8, 10 and 12.

Notice that the new storage object must first be created (using "New") in step 1615 by method 1600. The object is then opened in step 1620 using a new construct called "OpenWrite" which returns connection information for this object. A stream is then created in the usual manner in step 1625. In this example copying takes place at normal play time, however, the Play and PlayAt commands may be extended to permit faster (or slower) than real-time transmission.

Figure 15:
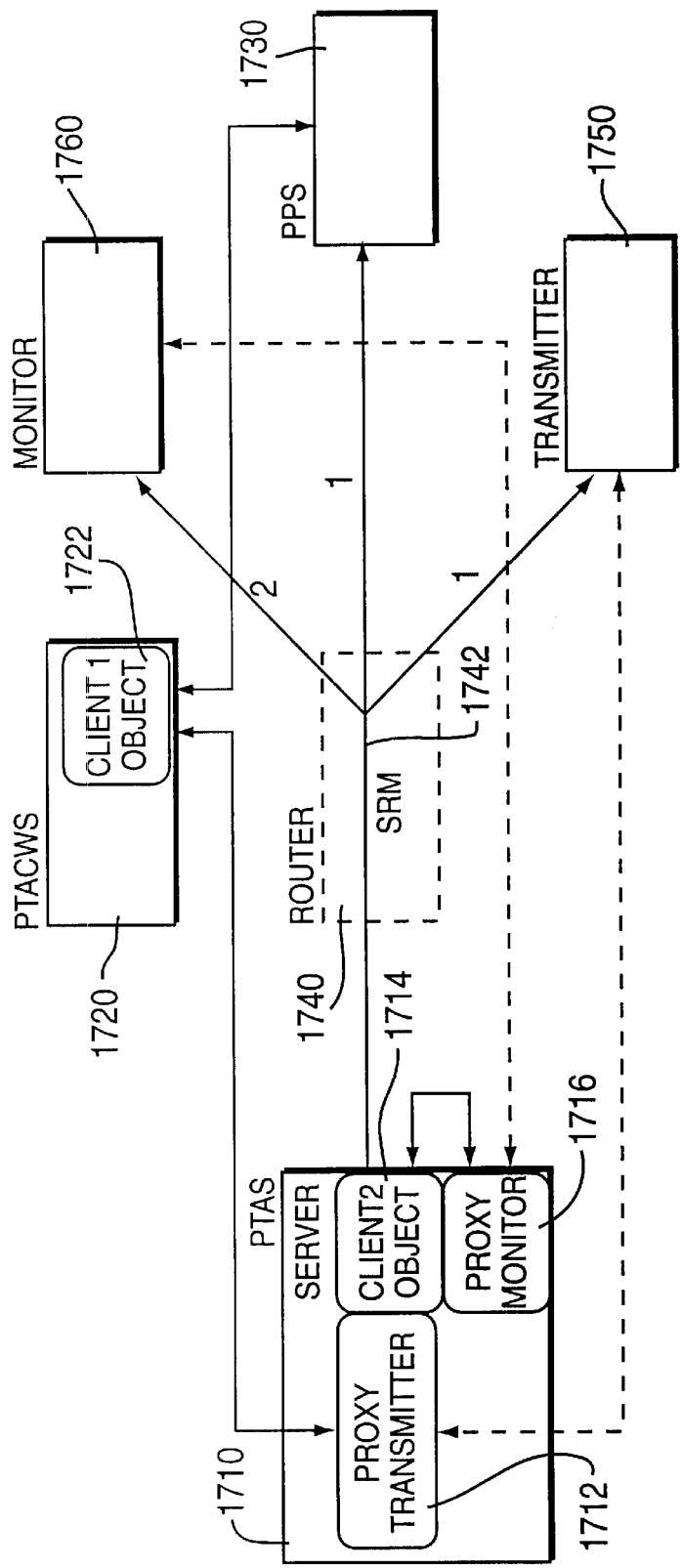
FIG. 15 is a graphical illustration of a DS-CC dialogue showing the distribution of video streams to multiple recipients and shared clients.

FIG. 15 illustrates a block diagram of an example of a DS-CC dialogue for the distribution of digital video streams to multiple recipients and shared clients via a router 1740. In the embodiment shown in FIG. 15, Client1 1722 on PTACWS 1720 initially opens a video feed to two destinations, a Transmitter 1750 via proxy transmitter 1712 and an archive backup 1730 PPS. Since these two video feeds are derived from the same source they cannot be separately controlled. At some later point, client2 1714 (subject to authorization) also attaches to the video stream 1742 and directs the output to a monitor 1760 via proxy monitor 1716. In the embodiment shown, client2 cannot control the stream 1742, although client1 can.

Figure 16:
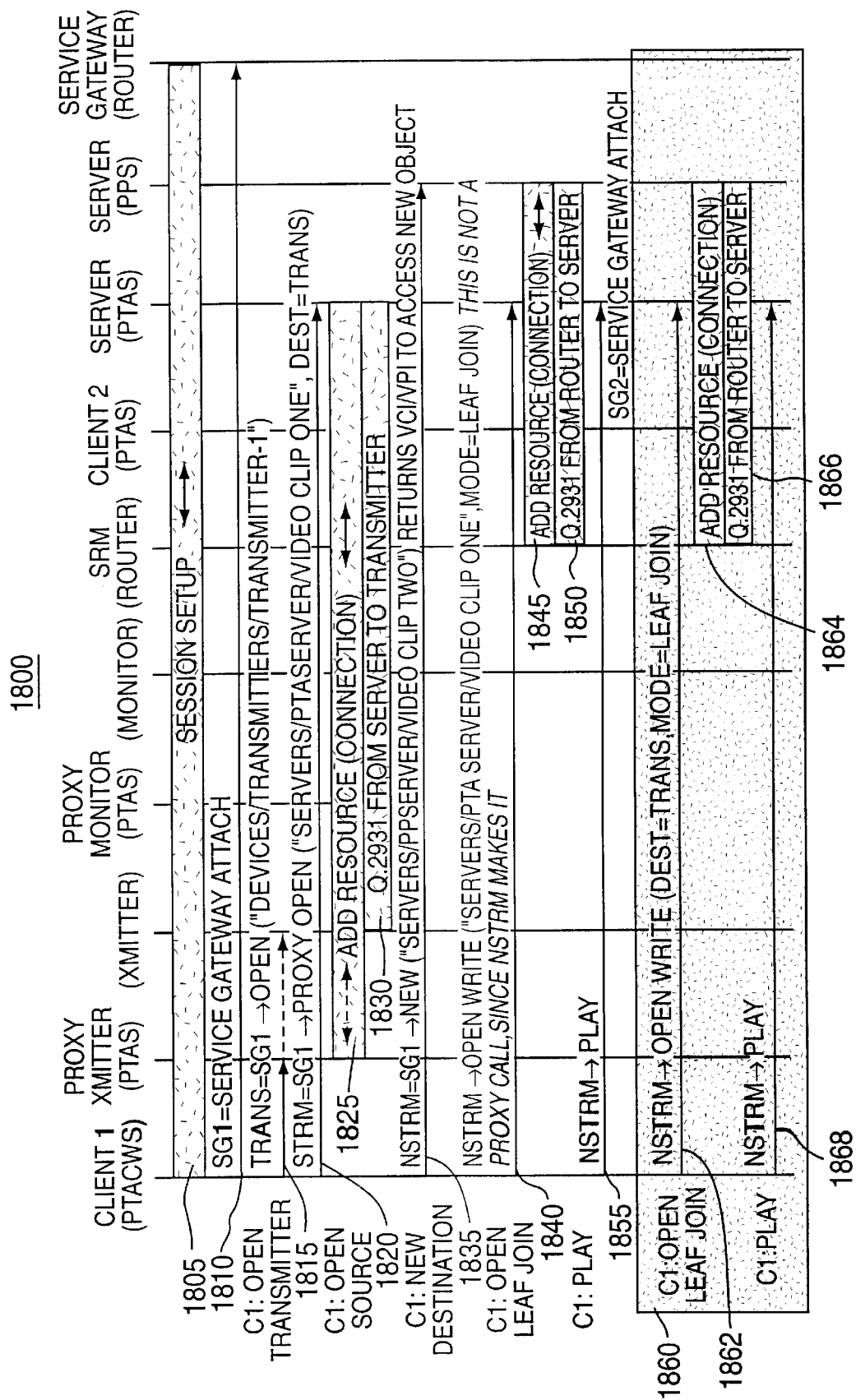
FIG. 16 is a timing diagram for the DS-CC dialogue shown in FIG. 15.
Figure 17:
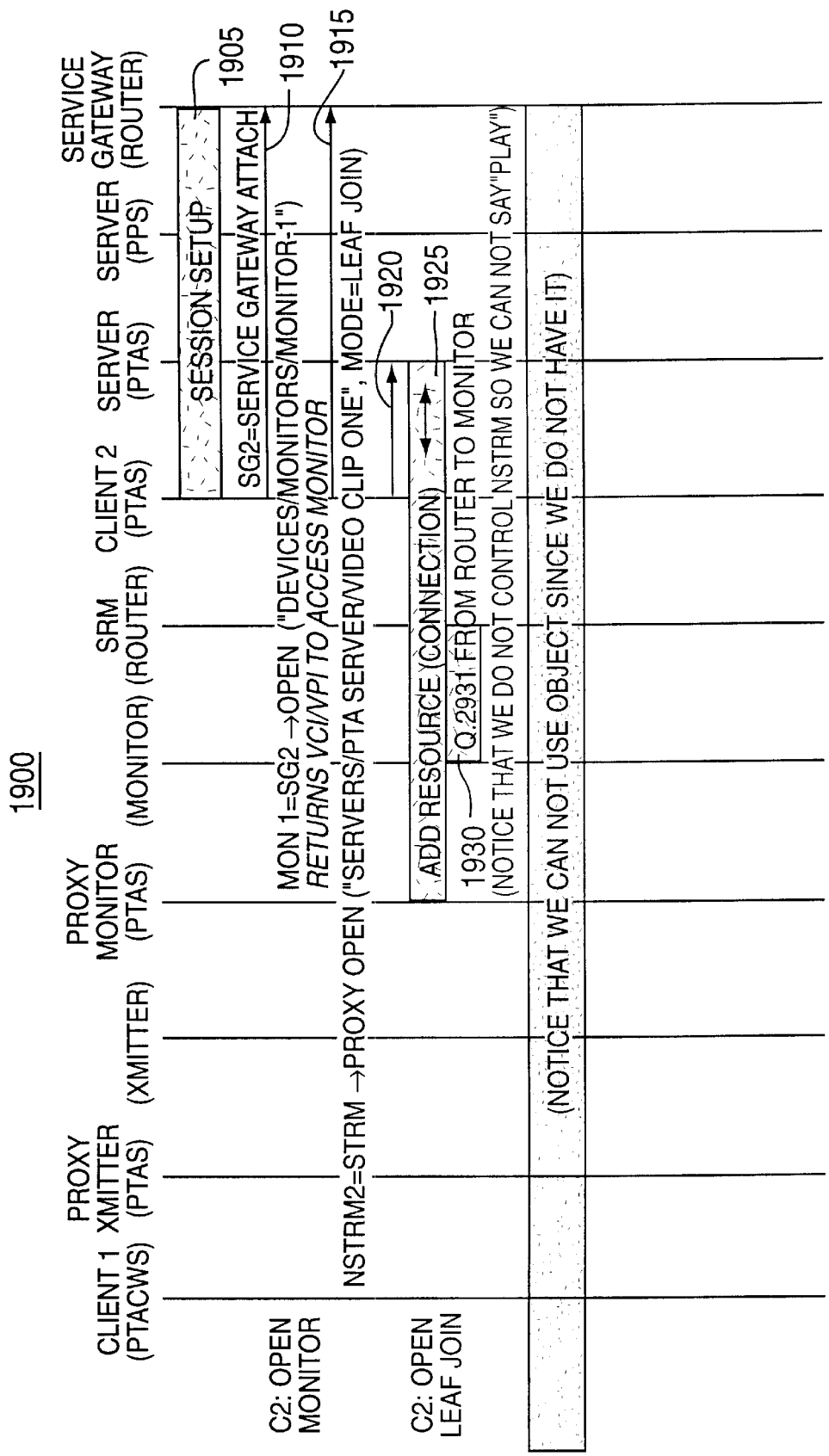
FIG. 17 is another embodiment of a timing diagram for the DS-CC dialogue shown in FIG. 15

The DS-CC time sequence diagram for the services depicted in FIG. 15 is shown in FIG. 16. To reduce repetitive description, description for steps 1805, 1810, 1815, 1820, 1825, 1830, 1845, 1850, 1855, 1864, 1866 and 1868 is referred to the above discussion with regard to FIGS. 6, 8, 10, 12 and 14.

As can be seen, on the occasion that client1 opens the second destination in step 1835, a specification is given to indicate that the connection is to augment an existing one via some parameter mechanism. In FIG. 15, this is indicated by the parameter Mode=LeafJoin in step 1840 by method 1800. This would be manifested as a Q2931 Call SetupIndication to the video server with the appropriate connection information. It should also be pointed out that there are a number of ways of Opening the second stream. One way is by specifying the video source (indicated in the figure by the first occurrence of C1:LeafJoin). Another approach is to specify one of the destination components (indicated in the figure in the shaded region in step 1860 at the bottom). In this case the SRM will identify which source is supplying the video stream and initiate a join from this stream. In either case the resulting stream emanates from the source and is split within the switch. This is important for performance considerations.

Another expected studio activity is for a second client to require access to a previously opened stream. This case is illustrated for the case of client2 in FIG. 17. To reduce repetitive description, description for steps 1905, 1910, 1925, and 1930 is referred to the above discussion with regard to FIGS. 6, 8, 10 12, 14 and 16.

The client starts with a usual SessionSetup and an Open to the destination proxy in step 1915 (a Monitor in this case). The proxy is then linked into the stream by using the Mode=LeafJoin indication in step 1920. In this case the source name for the stream has been specified.

This document has described an original approach to command and control within a digital compressed bitstream studio. The invention provides an original control methodology for typical studio operations such as splicing, storing and transcoding.

It is to be understood that the apparatus and method of operation taught herein are illustrative of the invention. Modifications may readily be devised by those skilled in the art without departing from the spirit or scope of the invention.

What is claimed is:

1. A command and control architecture for a digital studio having a plurality of studio components including studio components associated with respective objects, said objects providing representation of one or more functions of said respective studio components, said command and control architecture comprising:

means for locating a desired studio component by locating an object associated with said desired studio component;

means, coupled to said locating means, for acquiring control of said desired studio component by controlling said object associated with said desired studio component, means, coupled to said acquiring means, for specifying an interconnection to said desired studio component to establish a stream to said desired studio component; and means, coupled to said specifying means, for controlling said stream by controlling an object associated with said stream.

2. The command and control architecture of claim 1, wherein said object associated with said stream is an object corresponding to a state of an underlying image sequence.

3. The command and control architecture of claim 2, wherein said object associated with said stream is for manipulating selectively said underlying image sequence.

4. The command and control architecture of claim 3, wherein said object associated with said stream is manipulated for playing said underlying image sequence.

5. The command and control architecture of claim 3, wherein said object associated with said stream is manipulated for stopping a display of said underlying image sequence.

6. The command and control architecture of claim 3, wherein said object associated with said stream is manipulated for pausing a display of said underlying image sequence.

7. The command and control architecture of claim 3, wherein said object associated with said stream is manipulated for rewinding said underlying image sequence.

8. The command and control architecture of claim 3, wherein said object associated with said stream is manipulated for forwarding said underlying image sequence.

9. A method for managing digital data for a digital studio having a plurality of studio components including studio components associated with respective objects, said objects providing representation of one or more functions of said respective studio components, said method comprising the steps of:

(a) locating a desired studio component by locating an object associated with said desired studio component;

(b) acquiring control of said desired studio component by controlling said object associated with said desired studio component;

(c) specifying an interconnection to said desired studio component to establish a stream to said desired studio component; and (d) controlling said stream by controlling an object associated with said stream.

10. The method of claim 9, wherein said controlling step (d) controls said object associated with said stream that corresponds to a state of an underlying image sequence.

11. The method of claim 10, wherein said controlling step (d) controls said object associated with said stream for manipulating selectively said underlying image sequence.

12. The method of claim 11, wherein said controlling step (d) controls said object associated with said stream for playing said underlying image sequence.

13. The method of claim 11, wherein said controlling step (d) controls said object associated with said stream for stopping a display of said underlying image sequence.

14. The method of claim 11, wherein said controlling step (d) controls said object associated with said stream for pausing a display of said underlying image sequence.

15. The method of claim 11, wherein said controlling step (d) controls said object associated with said stream for rewinding said underlying image sequence.

16. The method of claim 11, wherein said controlling step (d) controls said object associated with said stream for forwarding said underlying image sequence.

17. A computer-readable medium having stored thereon a plurality of instructions, the plurality of instructions including instructions which, when executed by a processor, cause the processor to perform the steps comprising of:

(a) locating a desired studio component by locating an object associated with said desired studio component;

(b) acquiring control of said desired studio component by controlling said object associated with said desired studio component;

(c) specifying an interconnection to said desired studio component to establish a stream to said desired studio component; and (d) controlling said stream by controlling an object associated with said stream.

18. The computer-readable medium of claim 17, wherein said controlling step (d) controls said object associated with said stream that corresponds to a state of an underlying image sequence.

19. The computer-readable medium of claim 18, wherein said controlling step (d) controls said object associated with said stream for manipulating selectively said underlying image sequence.

20. The computer-readable medium of claim 19, wherein said controlling step (d) controls said object associated with said stream for playing said underlying image sequence.

* * * * *

UNITED STATES PATENT AND TRADEMARK OFFICE
CERTIFICATE OF CORRECTION

PATENT NO.    : 6,600,520 B1
DATED         : July 29, 2003
INVENTOR(S)   : Ward et al.

It is certified that error appears in the above-identified patent and that said Letters Patent is hereby corrected as shown below:

<u>Title page,</u>
Item [54], Title, please change "SOUND" to -- STUDIO --.

Signed and Sealed this

Twentieth Day of January, 2004

JON W. DUDAS
*Acting Director of the United States Patent and Trademark Office*